United States Patent

Holleitner

[15] 3,678,699
[45] July 25, 1972

[54] ABSORPTION

[72] Inventor: Hans Johann Gustav Holleitner, Solna, Sweden

[73] Assignee: Aktiebolaget Electrolux, Stockholm, Sweden

[22] Filed: Sept. 25, 1970

[21] Appl. No.: 75,368

[30] Foreign Application Priority Data

Sept. 29, 1969 Sweden................................13401/69

[52] U.S. Cl...............................................62/277, 62/490
[51] Int. Cl......................................................F25b 15/10
[58] Field of Search......................62/81, 110, 141, 277, 278, 62/490, 491, 492, 493

[56] References Cited

UNITED STATES PATENTS 2,956,415 10/1960 Kogel....................................62/141 X
3,338,062 8/1967 Kogel....................................62/490 X

*Primary Examiner*—William F. O'Dea
*Assistant Examiner*—P. O. Ferguson
*Attorney*—Edmund A. Fenander

[57] ABSTRACT

In an absorption refrigeration system employing an inert gas, refrigerant vapor expelled from solution in a generator normally is conducted from the vapor space of the generator through a main vapor line to a condenser in which the vapor is liquefied and from which liquid refrigerant is conducted to an evaporator to produce useful refrigeration. Frost accumulating on the evaporator is melted by expelled vapor which is diverted from the main vapor line through a U-shaped liquid trap and flows directly to the evaporator when the liquid trap is empty.

Defrosting is effected during the interval of time it takes for a definite quantity of liquid to collect in the trap, such liquid resulting from condensation of expelled refrigerant vapor in one arm of the trap in communication with the vapor space. Defrosting is again initiated after sufficient liquid continues to collect in the trap for all of the liquid to be removed therefrom by siphon action.

The one arm in horizontal cross-section is of annular form having spaced inner and outer upright walls, the inner wall being defined by a vapor conduit forming a part of the main vapor line and the outer wall being defined by a mantle which is disposed about the vapor conduit and in communication with the vapor space at its upper end.

4 Claims, 3 Drawing Figures

ABSORPTION

BACKGROUND OF THE INVENTION

1. Field of the Invention

The present invention relates to an arrangement in the boiler system of an absorption refrigerating apparatus operating with inert gas and having a connection for defrosting which is arranged between the vapor space of the boiler system and the evaporator system and in which a liquid seal is formed by condensation of working medium and periodically removed by a siphon, the standpipe for weak solution of the boiler being arranged in the vapor space formed by a pipe of the boiler.

2. Description of the Prior Art

Absorption refrigerating apparatus of the kind mentioned are on the market for some time during which a comparatively great number of apparatus have been manufactured. In some of these apparatus, the liquid heat exchanger is in the form of two concentric pipes extended through the boiler unit up to its vapor separating space. The outer pipe is extended further, curved and provided with a downward directed portion from which the connecting conduit to the evaporator system leads. In that end portion of the pipe which forms the free leg of the conduit arranged as an inverted U-pipe, refrigerant vapor is condensed during operation of the apparatus and in the condensed state builds up a liquid seal which keeps the connection to the evaporator system closed during the greatest part of the operating time. However, the liquid seal is in known manner emptied at certain intervals by the aid of a siphon by which the condensed refrigerant is conducted into the conduit for rich absorption solution of the boiler system. However, in these apparatus there have been difficulties in obtaining as long intervals between subsequent defrosting occasions and as long a time for each defrosting as intended. This seems to be due to the fact that that leg of the inverted U-pipe in which condensation is expected to occur, is situated at a certain distance from the other leg of the pipe, into which refrigerant vapor from the vapor generator is introduced. Furthermore, the inverted U-pipe is surrounded by the boiler unit heat insulation which also forms a heat insulation between the legs mentioned. These two factors cause during operation the temperature in the leg in which condensation is effected to be so much lower than the temperature in the other leg that the condensation occurs too rapidly. This can be compensated for in different ways, for instance by the dimensions of the conduits concerned, the location of the connection points of the conduits from the condensation leg and by adapting heat transferring members between the two legs.

Even if it thus has been possible to solve the problems relating to the function of the apparatus, it has turned out that the apparatus mentioned has some disadvantages, the elimination of which is desirable. By maintaining as high temperatures in the two legs of the inverted U-pipe as those prevailing in the vapor space of the boiler unit, one has either to calculate with considerable heat losses from the boiler unit, if its outer dimensions beside its heat insulation and casing therefor are small, or to resort to a more voluminous heat insulating body provided the same heat insulating material is used as before.

SUMMARY OF THE INVENTION

Since it is desirable to keep the heat losses low and the size of the boiler unit is of importance for the space required for the cooling apparatus in a refrigerator, it seems to be extremely desirable to find a solution by which are achieved both small heat losses and a heat insulating body of the boiler unit with small extension in a horizontal plane and especially in perpendicular direction to the cabinet wall at which the apparatus is disposed.

This purpose is attained by applying the present invention, which is characterized essentially in that a mantle disposed around the vapor conduit of the boiler and in open communication with the vapor space defines the space for the liquid seal in the defrosting connection to the evaporator system.

DESCRIPTION OF THE PREFERRED EMBODIMENT

Figure 1:
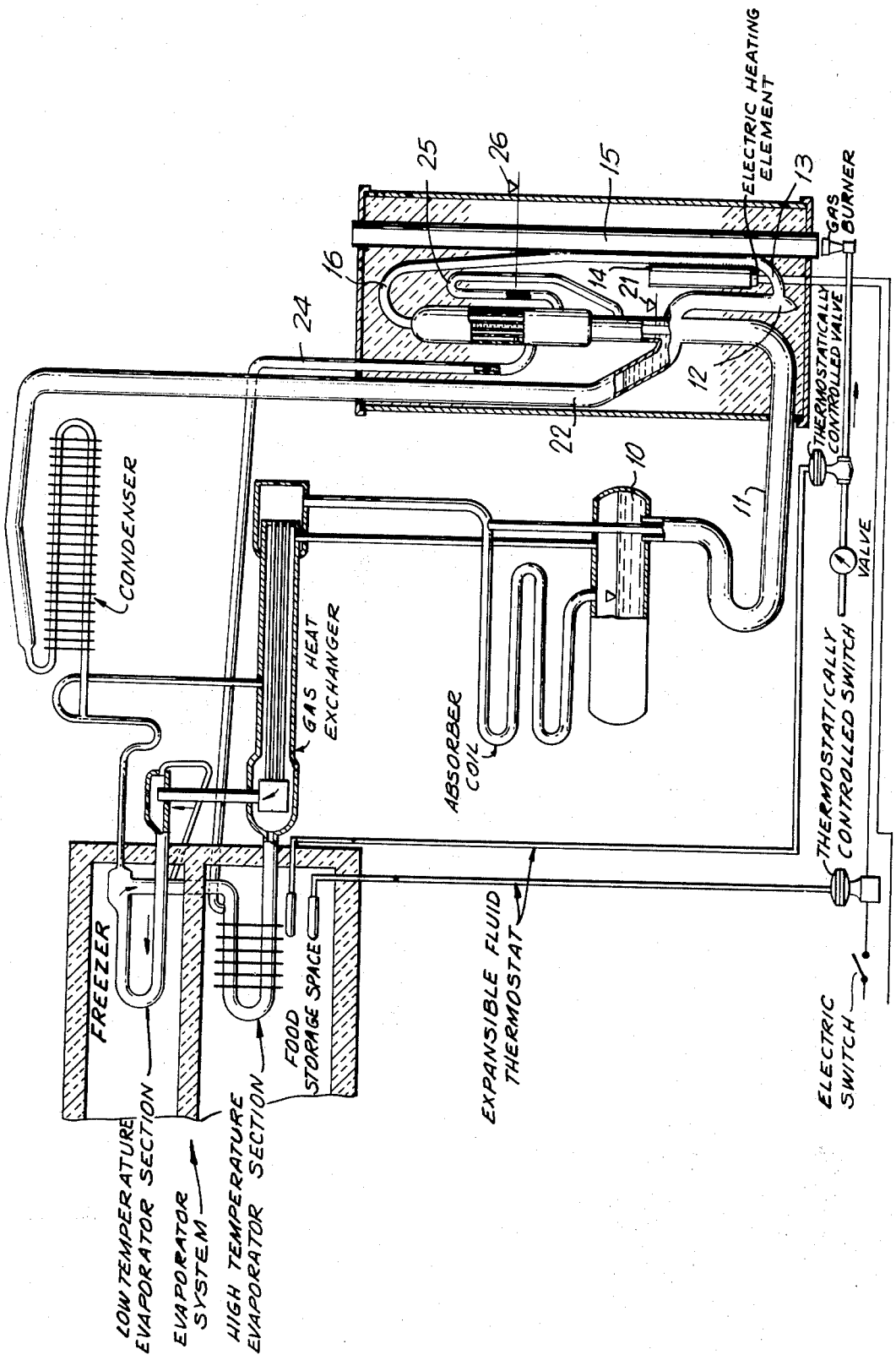
FIG. 1, which is partly in section, diagrammatically illustrates an absorption refrigeration system of the inert gas type embodying my invention.

FIG. 1 illustrates refrigeration apparatus having a generator or boiler unit embodying the invention. The parts of the apparatus with which the generator or boiler unit is associated, which include the absorber, condenser, evaporator structure and thermostatic control and are identified by captions in FIG. 1, can be made in a well known manner and like those described in U.S. Pat. No. 2,956,415 to W.E. Kögel, granted Oct. 18, 1960. The disclosure in the aforementioned Kögel patent may be considered as being incorporated in this application. The apparatus can be charged with known working media, such as water, ammonia and hydrogen being absorption medium, refrigerant and inert gas. Rich absorption solution flows from the absorber vessel 10 of the apparatus through the outer conduit 11 to the liquid heat exchanger and through a conduit 12 to the heat-operated pump 13 of the apparatus, the pump being shown heat-conductively connected on the one hand with a sleeve 14 for an electric heating cartridge and on the other hand with a flue pipe 15 for a gas burner. The two heat sources can be arranged to operate alternatively. The apparatus can also be adapted to be operated by only one source of heat. The riser 16 of the pump 13 discharges into a standpipe 17 for weak absorption solution, the upper part of the standpipe having openings 18 into a surrounding pipe 19. The pipe 17 is an extension of the inner pipe 20 of the liquid heat exchanger and the pipe 19 is an extension of the outer conduit 11 of the liquid heat exchanger. In the pipe 19, vapors generated in the pump are conducted downwardly to the rich solution in the outer conduit of the liquid heat exchanger and press down the liquid level 21 therein so far that the vapor through a vapor conduit 22 can be conducted further to the condenser, not shown, of the apparatus. The lower part of the vapor conduit 22 will thus function as an analyzer.

Figure 2:
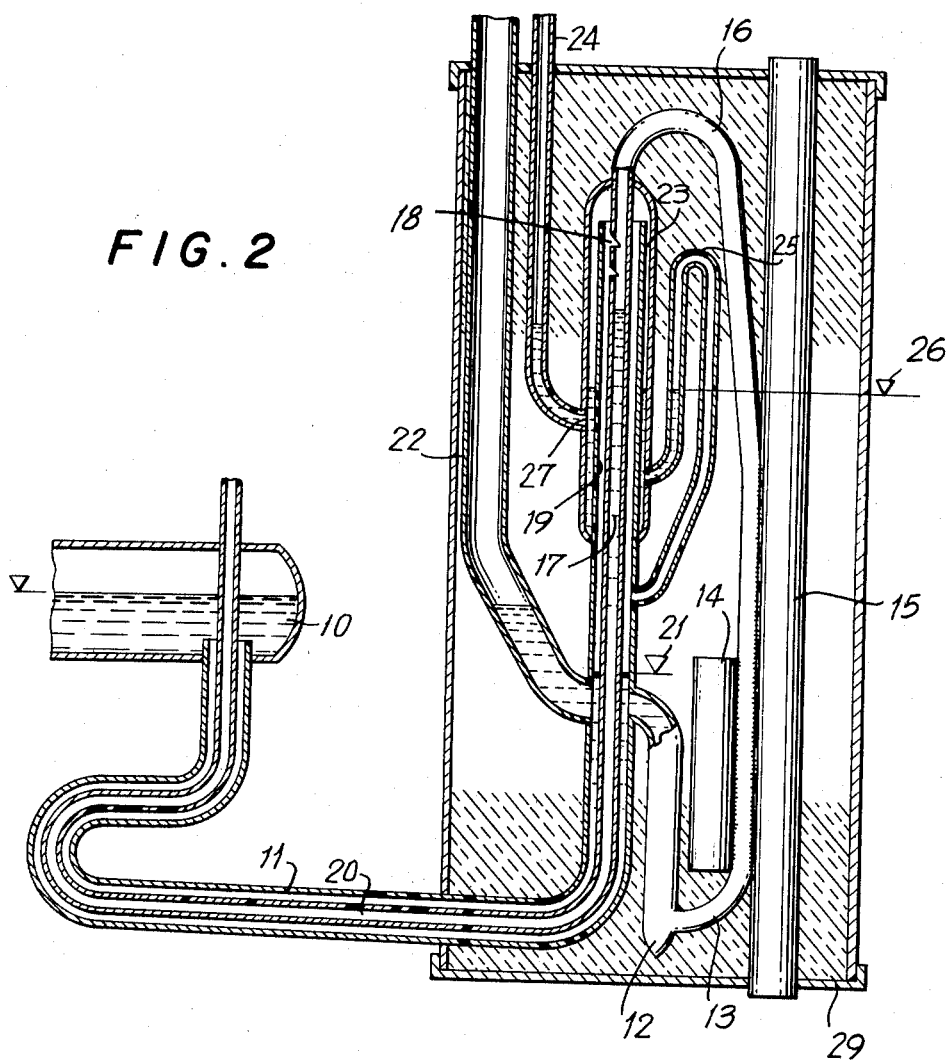
FIG. 2 is an enlarged fragmentary view of parts shown in FIG. 1.
Figure 3:
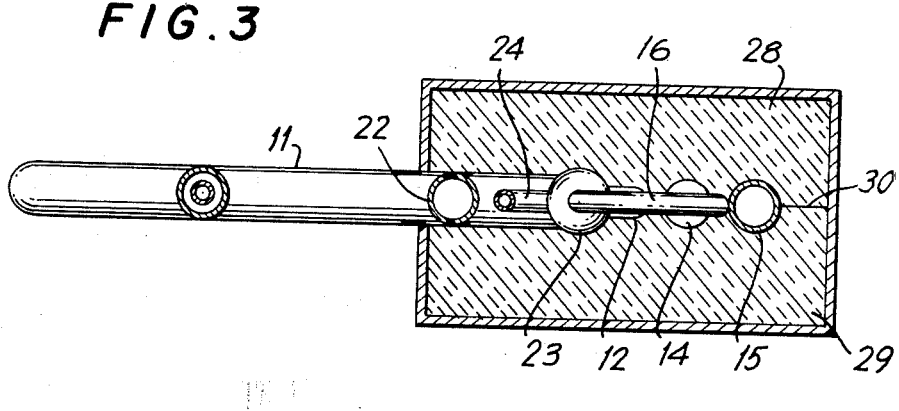
FIG. 3 is a horizontal sectional view of the parts shown in FIG. 2.

The upper part of the pipe 19 around the stand-pipe 17 is entirely open and discharges into a mantle 23 which is disposed suitably concentrically around the two pipes 17, 19 and in which refrigerant vapor is condensed and the condensate formed is collected. The mantle 23 communicates through a connecting conduit 24 with the evaporator system of the apparatus. A siphon 25 also is connected to the mantle or outer jacket 23 in such manner that condensate collected in the mantle at intervals is transmitted by the siphon to the pipe 19 and through this returns to the suction side of the pump. In FIG. 2, the apparatus is shown with refrigerant condensate in the jacket or mantle 23 up to a level 26 situated above the connection point 27 to the connecting conduit 24. Thereby, the apparatus operates with cooling effect and preferably controlled by a thermostat regulating the supply of heat. However, the level 26 will rise slowly during operation and when it has passed the highest point of the siphon 25, the condensate is discharged from the mantle down to the uppermost connection point of the siphon. Thereby, the connection for vapor through the mantle 23 and the connecting conduit 24 to the evaporator system are opened so that defrosting occurs therein. However, condensation in the mantle continues also during the defrosting and after a short time the condensate level rises above the connection point 27 so that the communication is interrupted by the liquid seal formed.

The defrosting function proper is previously known and what is essential in the new arrangement is to insure by very simple means that the space in which refrigerant vapor is condensed is automatically kept at a suitable level a few degrees below the temperature in the upper part of the pipe 19 from which the vapor enters into the mantle 23. It has proved that the described arrangement makes it possible to achieve not only the described condition of temperature but also a simple construction in which the condensing portion (the mantle 23) is in the form of a solid of revolution which during manufacture of the apparatus can be joined to other apparatus parts by mechanical, automatic welding, which gives both economic advantages and a uniform production quality.

If it is desired to manufacture apparatus according to FIG. 2 but without the details for defrosting, it will only be necessary to weld the upper part of the outer pipe to the entering pump pipe and desist from making the lower opening for the siphon.

An additional advantage of the construction described is that its simple construction permits manufacture of the boiler unit using essentially vertical pipes, the center lines of which are situated in a common vertical plane. By placing this plane parallel to the wall of the refrigerator, the entire boiler unit can be most effectively heat insulated by an insulating body with a very small extension out of the wall surface. This heat insulation can be made in a manner which is well known. For example, such insulation can comprise an insulating body having two complementary recessed insulating parts 28 and 29 applied on opposing sides of the above-mentioned vertical plane and abut one another at 30 to envelop the boiler pipes or parts.

I claim:

1. Absorption refrigeration apparatus of the inert gas type comprising
    a. a generator having a vapor space and in which refrigerant vapor is expelled from solution by heating,
    b. a condenser,
    c. a main vapor line for flowing expelled vapor from the vapor space of the generator to said condenser,
    d. an evaporator,
    e. conduit means for conducting liquid refrigerant from said condenser to said evaporator,
    f. a by-pass connection around said condenser for flowing expelled vapor from the vapor space of said generator to said evaporator, said by-pass connection including a trap,
    g. means to form a liquid seal in said trap by condensing refrigerant vapor in one arm thereof, and
    h. means including a siphon for withdrawing liquid out of said trap to remove said liquid seal,
    i. said one arm of said trap in horizontal section being of annular form having spaced inner and outer walls, the inner wall being defined by a vapor conduit forming a part of said main vapor line and the outer wall being defined by a mantle which is disposed about the vapor conduit and in communication with the vapor space at its upper end.

2. Apparatus as set forth in claim 1 in which said mantle has the shape of a solid of revolution.

3. Apparatus as set forth in claim 1 in which said generator comprises a plurality of vertical pipes having their center lines disposed essentially in a common vertical plane.

4. Apparatus as set forth in claim 3 in which said generator is insulated from the surroundings by a body of insulating material comprising two complementary recessed parts which are disposed at opposing sides of said vertical plane in abutting relation and envelop said pipes.

* * * * *